July 20, 1926.
F. G. BROWN
1,592,921
AUTOMOBILE TAIL LIGHT CONTROL AND INDICATOR DEVICE
Filed April 30, 1923
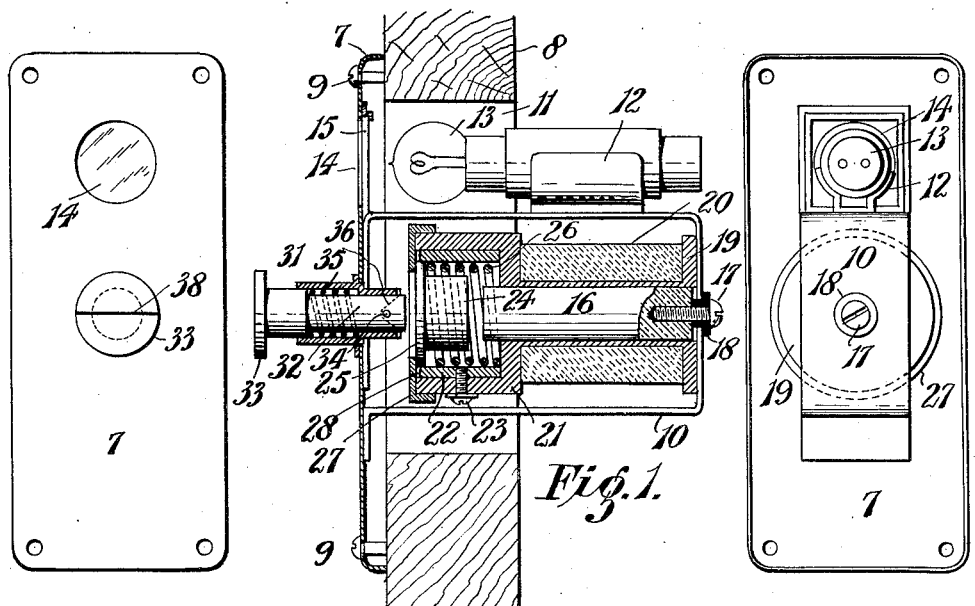
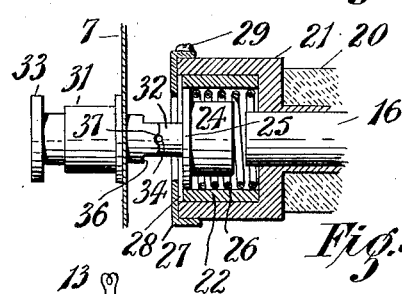
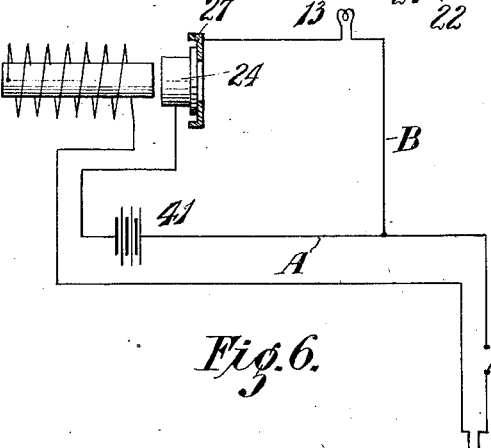
INVENTOR:
Frederick George Brown.
By John O. Seifert, Atty.

Patented July 20, 1926.

1,592,921

UNITED STATES PATENT OFFICE.

FREDERICK GEORGE BROWN, OF COOGEE, NEAR SYDNEY, NEW SOUTH WALES, AUSTRALIA, ASSIGNOR TO JAMES ANGUS MUNRO, OF SYDNEY, AUSTRALIA.

AUTOMOBILE TAIL-LIGHT CONTROL AND INDICATOR DEVICE.

Application filed April 30, 1923, Serial No. 635,450, and in Australia May 10, 1922.

This invention relates to an improved means for controlling, from the dash or instrument board of an automobile, the lighting of a tail-lamp or other lamp remote from the driver, and for automatically indicating whether such light is, or is not, illuminated.

The invention is adapted particularly, but not exclusively, for the control and the indication of the tail-lights of automobiles.

In some places a very stringent traffic regulation prohibits the placing within access of an occupant of a seat in an automobile of a switch whereby the tail-lamp is controlled, and compels the placing of said switch in such a position where its manipulation cannot be effected by a person in the vehicle. The purpose of this traffic regulation is to prevent the wilful extinction of the tail-lamp at night-time while the vehicle is travelling so as to thereby render indiscernible the numbers or other indicia of the vehicle indicator plate, board or casing. That the tail-lamp cannot be thus switched-off by an occupant of the vehicle may be a wise precaution, but the fact that the tail-lamp cannot be switched-on from the dash or instrument board is an unnecessary inconvenience.

It is an object of this invention to obviate this inconvenience by providing means whereby the tail-lamp can be switched-on by the driver without vacating his seat, while still keeping within the provisions of the regulation governing the switching-off of said lamp.

A further object of the invention is to provide means for automatically indicating to the driver of an automobile whether the tail-lamp is illuminated or has become extinguished.

A salient feature of the invention resides in the provision of an electro-magnetic switch so constructed and operating that the tail-lamp circuit may be closed thereby, but it cannot be broken unless a second switch located in a position, prescribed by the traffic regulation, is opened, said second switch being of the type that automatically closes.

A further feature resides in the provision of means including a pilot lamp that is arranged in a circuit, which is automatically closed when the tail-lamp becomes extinguished, thereby giving the driver a visible warning.

Reference is made to the accompanying drawings, wherein:—

Figure 1 is a view in central vertical section of an automatic electric controlling and indicator switch, representative of the invention, the integers being in the relative positions when the tail-lamp is extinguished and the indicator lamp illuminated.

Figures 2 and 3 are views in front elevation and in rear elevation, respectively, of the switch illustrated in Figure 1.

Figure 4 is a view in sectional plan of portion of Figure 1, illustrating the action with the tail-lamp illuminated and the indicator lamp extinguished.

Figure 5 is a detail view, in part section, showing the action when both circuits are interrupted and the tail-lamp and the indicator lamp are both extinguished for daylight travelling of the automobile.

Figure 6 is a diagram of the wiring of the switch and the indicator lamp and the tail-lamp.

In these views 7 designates the front metal plate of an electro-magnetic switch, said plate being affixed to the dash or instrument board 8 of an automobile by means of screws 9. A metal frame or bracket 10, substantially of rectangular configuration, is rigidly affixed to the rear surface of the plate 7 and is passed through an opening 11 formed in said dash or instrument board.

Carried by the upper member of said frame 10 is a metal clip or holder 12 supporting the stem of an indicator or pilot lamp 13, which is positioned directly opposite to a sight opening 14 formed in the front plate 7. This opening is covered by a disc 15 of glass or other transparent material, preferably colored red so as to at once attract the attention of the driver when said lamp is illuminated, thus indicating to him that the tail-lamp has become extinguished.

An iron core 16 is secured centrally within the frame 10 by a screw 17, which is insulated from said frame by means of a bush 18. A bobbin or reel 19 of suitable insulating material encircles the core 16 and is grooved or otherwise formed to receive an electro-magnetic coil 20. Said bobbin or reel is constructed with a tubular extension 21, within which is fitted a metal contact sleeve 22 that is retained in position by a wiring terminal screw 23.

An armature or iron plunger 24 is slidably mounted within the tubular extension 21 of said bobbin or reel. This armature or plunger has an end collar member 25, which is in slidable guiding engagement with the interior surface of said sleeve 22, while it also provides a seating for a helical spring 26 that is housed within said tubular extension.

When the electro-magnet is de-energized, the pressure of said spring exerted against the collar 25 forces the armature or plunger 24 forwardly until said collar is brought into contact with a metallic ring 27. This ring is fitted circumferentially about the outer end of the bobbin extension 21 and is insulated from the sleeve 22 by the air-gap 28 being locked in position by a wiring terminal screw 29.

The front plate 7 is provided with a bearing sleeve 31, within which is slidably and rotatably mounted a switch or push-rod 32 constructed with a finger-operating press knob or button 33. A pin 34 is fitted transversely to said rod 32 adjacent to its inner end, and encircling said rod and housed by the bearing sleeve 31 is a small helical spring 35.

Formed in the inner end of the bearing sleeve 31 are a pair of comparatively deep and oppositely disposed recesses 36, and a pair of relatively shallow recesses 37, the latter being arranged in a plane at right angles to the recesses 36. These pairs of recesses are adapted to receive the pin 34 and maintain the slidable and rotatable push-rod 32 in a selected position, while a diametral line 38 is formed on the outer surface of the finger-operating knob or button 33 to indicate the plane wherein the pin 34 is locked after each operation of said push-rod.

The coil 20 is connected at one end to the iron core 16 and at its opposite end to the circuit of the tail-lamp 39. The tail-lamp is also connected through a switch 40 to one pole of a battery 41. This switch is of the automatically closing type and it is located at a prescribed position, as for example at the rear of the automobile. The other pole of the battery is electrically connected to the terminal screw 23, that also functions to lock the metal sleeve 22 within the tubular extension 21 of the bobbin or reel 19.

The indicator or pilot lamp 13 is electrically connected to the metal contact ring 27 and the tail-lamp lighting circuit A by a shunt circuit B—see Figure 6.

Under daylight conditions, the push-rod 32 is pressed inwardly against the tension of the spring 35, and given a quarter turn within the bearing sleeve 31, when the pin 34 is engaged by the relatively shallow recesses 37. When in this position the diametrical indicator line 38 on the button 33 is vertical, and the armature 24 in this action is forced inwardly by the push-rod, against the tension of the spring 26, so that it does not form contact either with the core 16 or with the contact ring 27. With the integers of the switch in these stated positions—see Figure 5—neither the tail-lamp 39 or the indicator lamp 13 is illuminated as the tail-lamp circuit A is interrupted between the core and the armature and the shunt circuit B is interrupted between the contact ring 27 and said armature.

To switch-on the tail-lamp 39 from the dash or instrument board, the driver presses inwardly the push-rod 32 causing the armature 24 to be brought into contact with the end of the core 16. The push rod is then given a quarter turn, indicated by the diametral line 38 being in horizontal position. Upon release of said push-rod, it is returned to its outer position by the spring 35 with its pin 34 in locking engagement with the comparatively deep recesses 36—see Figures 1 and 4. When the armature 24 and the core 16 are brought into contact, the tail-lamp circuit A is completed; the tail-lamp 39 being thereby illuminated and said core energized, so as to maintain the armature in contact with said core by overcoming the tension of the spring 26. When the tail-lamp is illuminated, the shunt circuit B is interrupted at the metal ring 27, and, therefore, the indicator or pilot lamp 13 is extinguished.

Upon interruption of the circuit A, such as may be caused by manual operation of the tail-lamp switch 40 located at the rear of the vehicle, or by the burning-out of said lamp or from other causes, the core 16 is immediately de-energized and the armature 24, under the influence of the spring 26, is moved forwardly until the collar 25 contacts with the contact ring 27—see Figure 1. This action causes the shunt circuit B to be closed, illuminating the indicator or pilot lamp 13, which gives a red warning light through the sight opening 14 in the front plate 7.

It will be obvious that as the armature 24 can only be moved inwardly by action of the push-rod 32, and as no means are provided on the dash or instrument board to interrupt the tail-lamp circuit A, once it is closed, it is necessary for the driver to vacate his seat and manually operate the switch 40 to extinguish said tail-lamp, thereby complying with requirements of traffic regulations.

What I do claim is:—

1. An electro-magnetic switch comprising a front plate, a frame carried by said front plate, an electro-magnet mounted within said frame and connected to a circuit, a contact sleeve connected to a different circuit, an armature mounted in said frame and common to both circuits, a spring tending to press said armature against the contact sleeve, a guide sleeve formed on the front plate, a push rod slidable and rotatable in said guide sleeve and adapted to initially place the armature in contact with the core of the electro-magnet to close its circuit, a return spring acting on said push rod, and means for retaining said push rod in a selected position.

2. An electro-magnetic switch according to claim 1, wherein the guide sleeve has pairs of recesses of varying depth, a pin is carried by the push rod to engage a selected pair of said recesses and a button having an indicating mark is fitted to the end of said push rod.

3. An electro-magnetic switch according to claim 1 wherein the electro-magnet has an insulating bobbin constructed with a tubular extension housing the armature and its spring, the contact sleeve being fitted interiorly of said extension and retained in position by a wiring terminal screw.

4. An electro-magnetic switch comprising a front plate, a frame carried by said front plate, an electro-magnet mounted in said frame, said electro-magnet having a bobbin constructed with a tubular extension, a contact ring in said extension, a spring-pressed armature housed in said extension and a contact member on said armature.

In testimony whereof I affix my signature.

FREDERICK GEORGE BROWN.